United States Patent [19]
Adams

[11] Patent Number: 5,433,413
[45] Date of Patent: Jul. 18, 1995

[54] TRANSPARENT WALL HOOK

[75] Inventor: William E. Adams, Portersville, Pa.

[73] Assignee: Adams Mfg. Corp., Portersville, Pa.

[21] Appl. No.: 602,737

[22] Filed: Oct. 24, 1990

Related U.S. Application Data

[63] Continuation-in-part of Ser. No. 426,162, Oct. 25, 1989, abandoned.

[51] Int. Cl.$^6$ .............................................. F16M 13/00
[52] U.S. Cl. ................................... 248/205.3; 248/290; 248/304; 248/224.3; 248/225.1
[58] Field of Search .................. 248/205.3, 290, 304, 248/301, 303, 308, 221.4, 222.1, 225.1, 225.2, 220.2, 467, 224.3, 224.4, 444.1, 485, 205.4; 52/390

[56] References Cited

U.S. PATENT DOCUMENTS

| | | | |
|---|---|---|---|
| D. 24,588 | 7/1895 | MacPhail. | |
| D. 182,034 | 5/1958 | Merendino. | |
| D. 231,422 | 3/1974 | Berend. | |
| D. 242,407 | 6/1976 | Enckler. | |
| D. 299,423 | 6/1989 | Davis. | |
| D. 305,431 | 1/1990 | Adams | 8/367 |
| D. 710,803 | 3/1902 | Richmond. | |
| 741,004 | 10/1903 | Van Nostran | 248/290 X |
| 1,723,603 | 9/1929 | Gates | 248/224.3 X |
| 1,848,937 | 3/1932 | Coventry | 248/304 X |
| 2,255,712 | 9/1941 | Phillips | 52/390 |
| 2,319,638 | 2/1943 | Sheker | 248/304 |
| 2,447,128 | 8/1948 | Logan | 248/290 X |
| 2,479,115 | 5/1949 | Inman | 248/305 |
| 2,765,998 | 10/1956 | Engert | 248/205.3 |
| 2,919,881 | 1/1960 | Eames | 248/290 |
| 3,245,645 | 4/1966 | Dupler | 248/224.3 |
| 3,685,660 | 8/1972 | Saunders | 211/60 |
| 3,918,668 | 11/1975 | Thorpe | 248/205.3 |
| 4,008,871 | 2/1977 | Rex | 248/304 X |
| 4,308,961 | 1/1982 | Kunce | 248/222.2 |
| 4,372,450 | 2/1983 | Licari et al. | 248/220.2 X |
| 4,482,912 | 6/1989 | Hutter, III | 248/205.3 |
| 4,609,173 | 9/1986 | Belokin | 248/225.1 |
| 4,767,094 | 8/1988 | Brown | 248/444.1 |

FOREIGN PATENT DOCUMENTS 15278 of 1906 United Kingdom ............. 248/225.2

OTHER PUBLICATIONS

Adams Manufacturing Product Sheet "Fasteners That Fasten", Copyright 1990.

*Primary Examiner*—Karen J. Chotkowski
*Attorney, Agent, or Firm*—Buchanan Ingersoll; Lynn J. Alstadt

[57] ABSTRACT

An unobtrusive hook for holding things on walls and other flat surfaces is disclosed which comprises a hook body from which things may be hung and a mounting portion attached to the hook body, a hook holder made of clear plastic having a mouth into which the mounting portion of the hook body can be inserted and transparent tape attached to the hook holder in a manner to allow the hook holder to be mounted on a flat surface. The hook body and mounting portion are preferably made of a hard plastic whereas the hook holder is made of a clear, flexible, soft plastic.

1 Claim, 3 Drawing Sheets

TRANSPARENT WALL HOOK

CROSS REFERENCE TO RELATED APPLICATION

This application is a continuation-in-part of my U.S. patent application Ser. No. 426,162, filed Oct. 25, 1989.

FIELD OF THE INVENTION

The invention relates to an unobtrusive hook to hold things on walls and other flat surfaces.

BACKGROUND OF THE INVENTION

Numerous hooks have been developed for holding things on walls and other flat surfaces. Some are mounted by being screwed into the wall. Others are attached by adhesives. Many plastic hooks have been made for attachment to walls. These hooks generally have an adhesive back formed out of double face foam tape. The foam tape conforms to the tiny bumps and irregularities such as those found on plastered walls. This tape is not transparent. Thus, even if the hook is formed of a transparent material, one can always see the hook hanging on the wall.

U.S. Pat. No. 4,609,173 to Belokin discloses a hook holder towel rack combination in which the hook holders are made of flexible, but not soft, plastic impregnated with magnetic material. The patent states that a towel rack portion covers the hook holder, thus blocking the view of the hook holder. There is no concern about the appearance of the hook holder. Such hook holders are not unobtrusive. Rather, when the hook portion or towel rack portion is not attached, the hook holder is very noticeable. Moreover, because the hook holder is made of flexible plastic which is not soft, it does not conform to any irregularities on the surface to which it is applied. This reduces the strength of the adhesive bond on the wall.

There is need for a soft, transparent plastic hook which cannot be seen except upon close inspection. Such a hook would not detract from the wall when nothing is hung from it nor would it be readily seen when objects are hung from the hook.

SUMMARY OF THE INVENTION

I have developed a transparent hook which has three portions. There is a mounting layer, a hook holder and a mounting hook. The mounting layer is preferably transparent tape. The hook holder is a piece of soft clear plastic having a mount adapted to hold a hook. The hook itself is a clear harder plastic. The hook may be inserted into the soft plastic of the hook holder during molding or may be manually put into place. The hook is held in the plastic hook holder by the mouth which surrounds it. The hook holder can also be designed to allow the tape to adhere to the mounting head of the hook. My transparent hook is strong enough to hold objects which weigh as much as 15 pounds. Yet, my hook is hardly noticeable when affixed to a wall. The softness of the plastic allows my hook holder to conform to rough surfaces. The clearness of the plastic makes the hook holder difficult to see on a wall. Other objects and advantages will become apparent as a description of the present preferred embodiments proceed.

DESCRIPTION OF THE PREFERRED EMBODIMENTS

Figure 1:
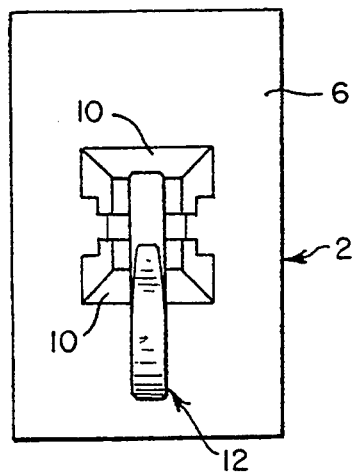
FIG. 1 is a front view of a first present preferred embodiment of my transparent wall hook.
Figure 2:
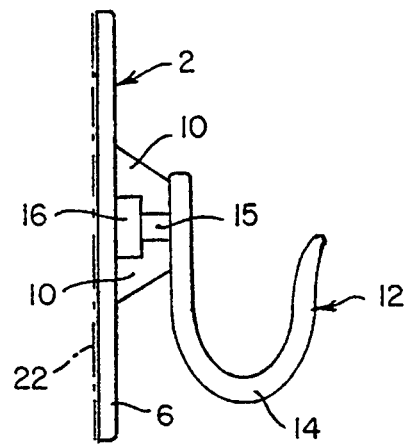
FIG. 2 is a side view of the embodiment of FIG. 1.
Figure 3:
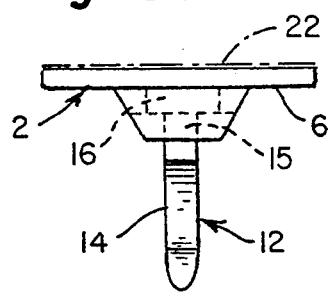
FIG. 3 top view of the embodiment of FIG. 1.
Figure 4:
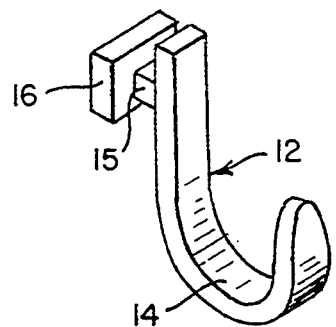
FIG. 4 is a perspective view of the hook portion of the embodiment of FIG. 1.
Figure 5:
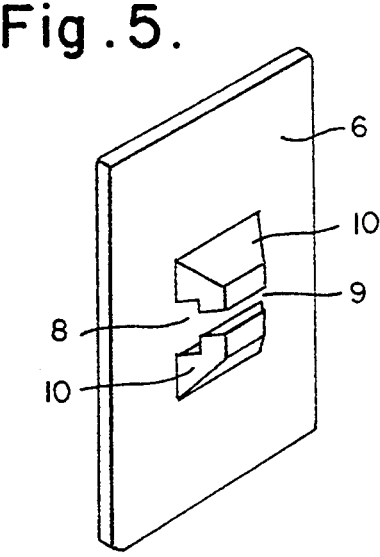
FIG. 5 is a perspective view of the hook holder portion of the embodiment of FIG. 1.

As shown in FIGS. 1, 2 and 3, I provide a hook holder 2 which is made of soft clear plastic. Because hook holder 2 is soft, it conforms to any irregularities to which it is applied. I prefer to use clear vinyl having a durometer ranging from below 60 to 95, but preferably about 80-85. The hook holder is affixed to a wall by transparent tape 22, affixed to the back 4 of the hook holder 2. On the face 6 of the hook holder I provide a mouth 10 which is sized and configured to form a cavity 8 and slot 9. A hook 12 is inserted into the cavity 8 of the hook holder in a manner so that the head 16 of the hook is fully inside the cavity 8. The neck portion 15 of the hook rests in slot 9. The body 14 of the hook 12 extends from the neck 15. Preferably, the body is curved in a manner to hold an object. However, the hook body may be configured in any appropriate manner. I prefer to make the hook of hard clear plastic such as polycarbonate or clear hard vinyl having a durometer over 95.

The entire hook assembly is affixed to the wall by mounting tape 3. The clear tape 3 which holds the hook holder 2 to the wall preferably has a transparent backing 5 which must be removed. Because the clear tape is thin, I prefer to have the tape backing 5 on the sheet extend beyond the tape 3 so that the backing 5 can easily be peeled. Since the tape 3, hook holder 2 and hook 12 are all transparent, the device will not be readily apparent when attached to a wall. As shown, particularly in FIG. 2, I prefer to maximize the area of surface contact between the hook head 16, neck 15 and body portion 14 of the hook 12 and the mouth 10 of the hook holder 2. Such a configuration maximizes the holding power of the hook holder 2 and the hook 12. Although I have shown mouth 10 to have two portions separate from one another, it should be apparent that one could construct a side wall (not shown) on one side of the mouth to increase the contact area between the head 16 and neck 15 of the hook 12 and the mouth of the hook holder 2.

Preferably, face 6 of hook holder 2 is surface treated to produce irregularities thereon. These irregularities diffuse the light striking the face 6, thereby minimizing the reflection of light from hook holder 2. Consequently, the hook holder is less noticeable and not likely to be seen by the casual observer.

In the figures I have shown a present preferred shape for the mouth. However, it should be apparent that any configuration which enables the hook to be inserted into the hook holder is appropriate. Furthermore, one can insert hook 12 into a mold being used to form hook holder 2 and then fill that mold with plastic. In this situation, the hook 12 should have its head 16 and neck 15 completely surrounded by plastic hook.

Preferably, tape 3 provided on hook holder 2 is an acrylic pressure sensitive adhesive. I have found that such an adhesive maintains its bonding characteristics after extended contact with hook holder 2 and the wall. Other adhesives lose their bonding characteristics during extended use, resulting in hook holder 2 being pulled away from the wall. A suitable adhesive is made by 3M and sold as a medium firm acrylic type adhesive.

In the configurations shown in FIGS. 1 thru 5, the hook 12 can be easily removed from the hook holder 2. Thus, the user may elect to remove the hook 12 from the hook holder 2 when the hook is not in use. The hook holder 2 and transparent tape 22 mounted on the wall would be less noticeable without the hook being attached.

Figure 6:
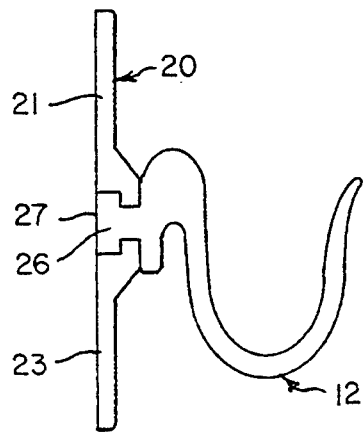
FIG. 6 is a side view of a second present preferred embodiment of my transparent wall hook.

In FIG. 6, I have shown a second present preferred embodiment in which the head 26 of hook 22 is inserted into the hook holder 20 in a manner so that the outer face 27 of the head portion 26 of hook 32 would be contacted by transparent tape 22 which affixes the assembly to a wall (not shown). In this embodiment the hook holder 20 could be of a two piece construction 21 and 23 or it could be configured to have slots which extend through one side of hook holder 20. The advantage of this embodiment is that it provides for an adhesive between the wall and the hook and bonds the hook to the hook holder. This method will reduce tooling costs because tolerances between hook and hook holder do not have to be as close.

Figure 7:
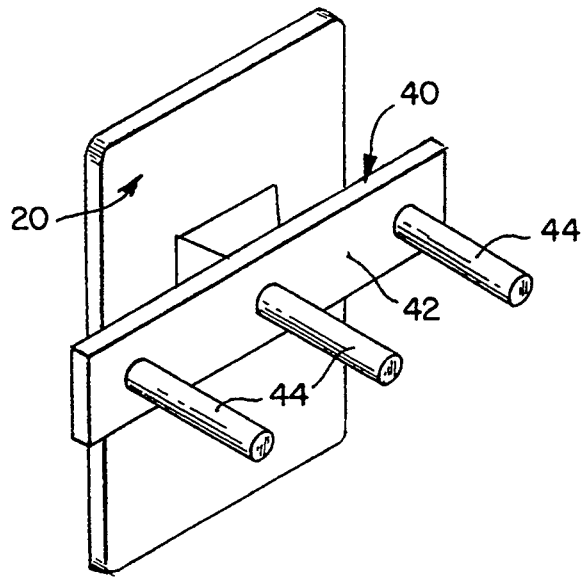
FIG. 7 is a perspective view of a third present preferred embodiment of my transparent wall hook.
Figure 8:
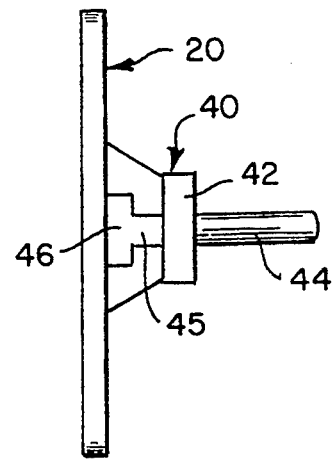
FIG. 8 is a side view of the embodiment of FIG. 7.

Other kinds of hooks may be inserted in the hook holder to hang other items. For instance, a 3-prong hook 40 for keys is illustrated in FIGS. 7 and 8. This hook 40 has a base 42 and a series of pins 44 which extend therefrom. The hook 40 is fitted onto a hook holder 20 which as illustrated in FIG. 8 can be identical to the hook holder of FIG. 6 or can be the hook holder of FIG. 1. A head 46 and neck 45 extend from the base of hook 40 and are fitted into the mouth of the hook holder. Again, I prefer to make the hook holder 20 from clear vinyl and the hook 32 from hard plastic.

Figure 9:
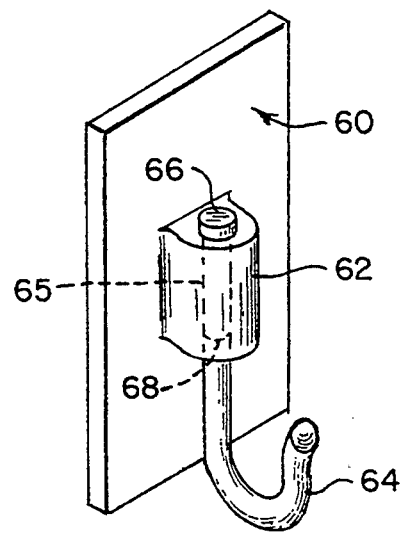
FIG. 9 perspective view of a fourth present preferred embodiment of my transparent wall hook.

My transparent wall hook may also be configured as shown in FIG. 9. Again I provide a soft clear plastic hook holder 60 which is affixed to a wall by transparent tape (not shown) applied to the back of the hook holder 60. The mouth 68 is formed by a hemispherical protrusion 62 of clear plastic which extends from the face of the hook holder 60. A curved hook 64 is fitted through the mouth 68 until the head 66 of the hook 64 rests on the protrusion 62. Preferably, the hook 64 and mouth 68 are sized so that the mounting portion 65 of the hook 64 makes a tight fit.

Figure 10:
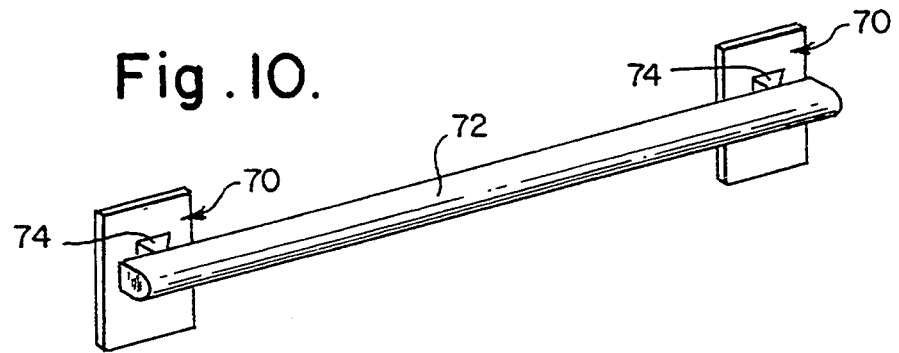
FIG. 10 is a plan view of a fifth present preferred embodiment of my transparent wall hook which utilizes two hook holders.

One may also use two or more hook holders 70 to hold a towel bar or rack 72 as shown in FIG. 10. The back of the rack 72 should have heads like those shown on the hooks in FIGS. 2, 3, 4, 6 and 8 which fit into mouths 74 on the hook holders 70. Although I have shown two hook holders 70 in FIG. 10 any desired number of these units could be used. The hook holders 70 are attached to the wall by transparent tape (not shown) as have been the previously discussed embodiments. Additionally, two or more may also be used for holding a small shelf.

Figure 11:
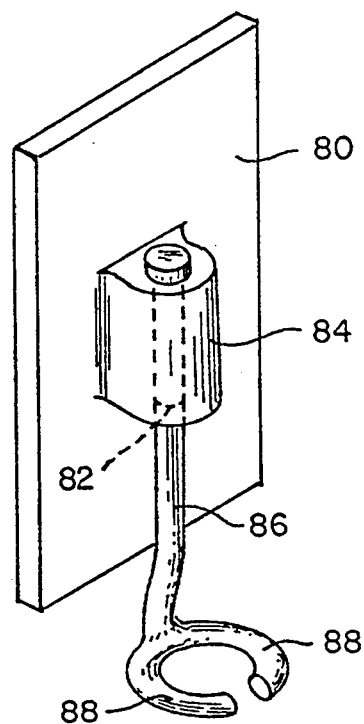
FIG. 11 is a perspective view of a sixth present preferred embodiment of my transparent wall hook.

My transparent wall hook may also be configured as shown in FIG. 11. Again, I provide a soft clear plastic hook holder 80 which is affixed to a wall by transparent tape (not shown) applied to the back of hook holder 80. Mouth 82 is formed by a hemispherical protrusion 84 of clear plastic which extends from the face of the hook holder 80. The upper portion of a curved hook 86 having depending perpendicular circumferential arms 88 extending therefrom is fitted through the mouth 82 until the head 90 of the hook 86 rests on the top of the protrusion 84. Preferably, the hook 86 and mouth 82 are sized so that the mounting portion of the hook 86 makes a tight fit. Hook 86 is particularly adapted for holding a tooth brush, razor, or like instrument.

Figure 12:
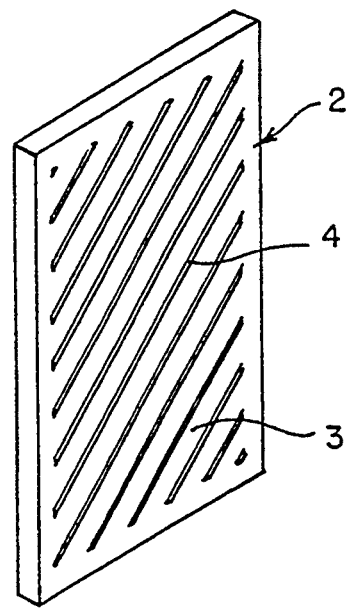
FIG. 12 is a perspective view of the back of my hook holder having optional grooves to improve gripping.

Although there are several advantages to using a soft durometer plastic for the hook holder, I have observed that my hook holder has begun to separate from the tape affixed to the wall under load. The separation begins as a bubble behind the mouth 8 of the embodiment of FIG. 5 or the protrusions 62 in the embodiment of FIG. 9. The bubble grows over time so that after several weeks or months the hook holder pulls away from the wall. To overcome or at least minimize this problem, I prefer to provide grooves 4 in the back 3 of the hook holder 2 as shown in FIG. 12. Preferably the grooves are angled relative to the sides. The grooves increase the surface area available to the adhesive and permit better gripping. As shown in the drawing, the grooves should not extend to the edges of the hook holder 2 as that would permit air to enter. Although I prefer to use angled grooves, one could also achieve the same benefit by otherwise increasing the surface area of the hook. For example, one could sand or blast scratches or small depressions into the back surface. I have found that increasing the back surface area is particularly useful for hook holders made of 75 durometer plastic.

Figure 13:
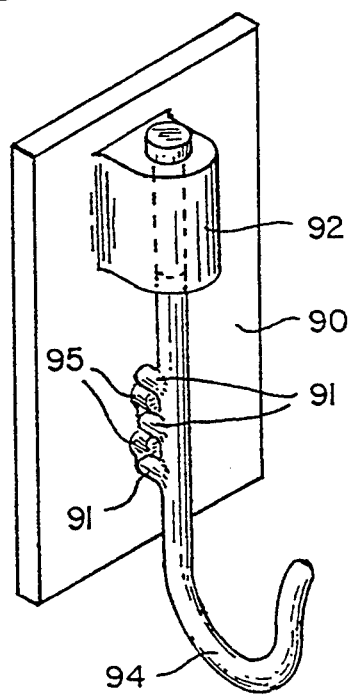
FIG. 13 is a perspective view of a seventh preferred embodiment of my transparent wall hook.

Another way to overcome the separation problem is shown in FIG. 13. In this embodiment I provide projections on the back of the hook 94. When a load is applied to hook 94 these projections 91 press against the hook holder 90. This force is directed against the wall thereby improving adhesion between the wall and the tape and between the tape and the hook holder in the area behind the projections. One should recognize that protrusion 92 may serve as a fulcrum at its lower end causing the surface area behind the upper portion of projection 92 to pull away from the wall. This problem can be minimized by positioning the projection 92 to have a substantial portion of the hook holder above it and by increasing the size of projections 91. To spread the weight over a greater area as well as to index the position of hook 94, I prefer to provide mating projections 95 which extend from the face of hook holder 90.

Still another way to reduce the separation problem is to increase the size of the hook holder. Alternatively, one may lower the position of the projection 92 to provide more surface area above the projection.

One could also use a pin, staple, or other small fastener to provide additional adhesion between the tape and the hook holder. If the fastener has a small head, it will not be noticed by a causal observer. However, the use of fasteners with large heads should be avoided as they would defeat the purpose of selecting a transparent wall hook.

Figure 14:
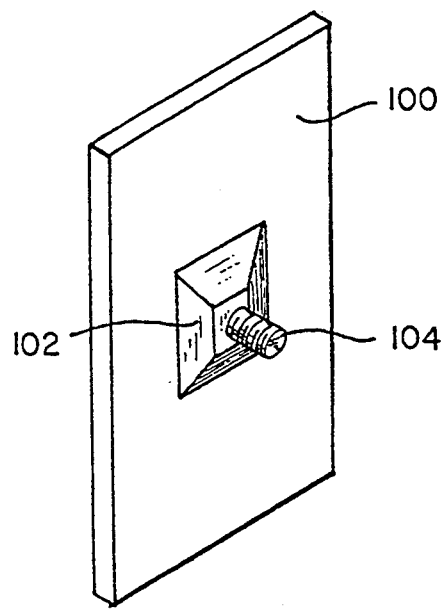
FIG. 14 is a perspective view of an eighth preferred embodiment of my transparent wall hook.

My transparent wall hook could also be configured to hold a threaded post on which objects could be mounted as shown in FIG. 14. There the hook holder 100 has a projection 102 on its face, a threaded rod 104 is molded or screwed into the projection. Here the end of the rod 104 inserted into projection 102 serves as the mounting portion. In this embodiment the hook holder should be made of a soft, flexible plastic whereas the threaded rod 104 should be of a clear, hard plastic. When one wishes to attach an object to the embodiment shown in FIG. 14 he simply places a nut onto the end of rod 14 to secure the object in place.

Although I have shown certain present preferred embodiments of my invention, it should be distinctly understood that the invention is not limited thereto, but may be variously embodied within the scope of the following claims.

I claim:

1. An unobtrusive hook for holding things on walls and other flat surfaces comprising:
    a) a hook body having a durometer over 95 from which things may be hung and a mounting portion attached to the hook body;
    b) a hook holder made of soft, flexible clear plastic having a durometer of at least 60 and less than 95, the hook holder having a flat back and a flat face opposite the back, such that the durometer allows the back of the hook holder to conform to rough surfaces, the face having a mouth into which the mounting portion is fitted, the mouth sized and configured to grip the mounting portion of the hook body; and
    c) transparent tape attached to the back of the hook holder, the tape having an adhesive surface for attachment of the holder to a surface, wherein the mounting portion of the hook body is a pin having an enlarged head.

* * * * *